(No Model.)

S. F. COUES.
SICK ROOM REFRIGERATOR.

No. 254,428. Patented Feb. 28, 1882.

UNITED STATES PATENT OFFICE.

SAMUEL F. COUES, OF BROOKLYN, ASSIGNOR OF ONE-HALF TO JOSEPH J. WALTON, OF NEW YORK, N. Y.

SICK-ROOM REFRIGERATOR.

SPECIFICATION forming part of Letters Patent No. 254,428, dated February 28, 1882.

Application filed December 27, 1881. (No model.)

*To all whom it may concern:*

Be it known that I, SAMUEL F. COUES, of Brooklyn, in the county of Kings and State of New York, have invented certain new and useful Improvements in Sick-Room Refrigerators; and I do hereby declare that the following is a full, clear, and exact description thereof, reference being had to the accompanying drawings, and to the letters of reference marked thereon, which form part of this specification, in which—

Figure 1:
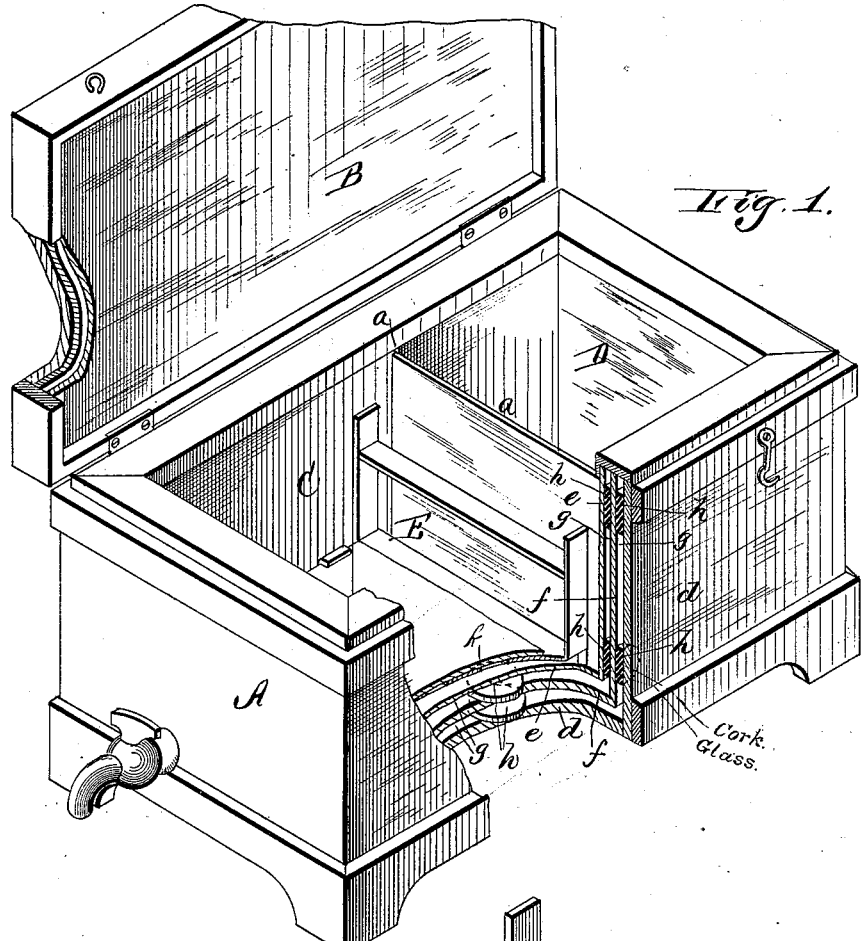
Figure 2:
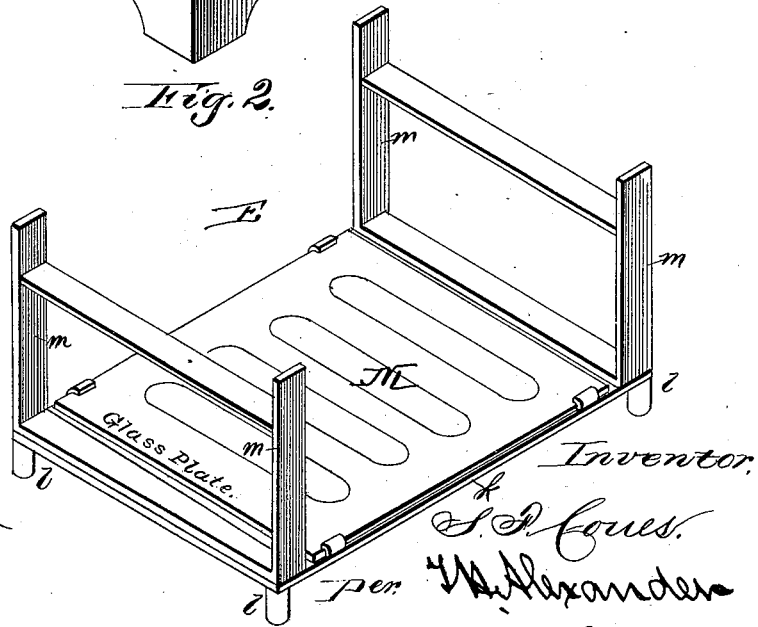

Figure 1 is a perspective partly in section, and Fig. 2 a perspective view of the ice-holder.

The object of my invention is to combine a receptacle for the preservation of ice, a water-cooler, and a miniature refrigerator adapted in size and arrangement and by non-absorbent properties especially to the use of the sick, by the bedside of the patient.

My invention consists essentially in the construction of a very small refrigerating box, entirely of wood, metal, and glass, the latter being interposed between the wood and metal and between two air-spaces, and held in place by disks or strips of cork or other elastic material, which will prevent the breaking of the glass by a jar.

My invention consists, also, in a reversible support for ice, provided with a glass bottom, which will keep dry a greater or a less quantity of ice, and keep cool a greater or less quantity of water, and also in a free space for ice-water under the false bottom of the refrigerating compartment. The arrangements will be hereinafter explained.

In the drawings hereto annexed, A designates the body of the chest, and B the lid or cover thereof.

C is the ice-box, and D the receptacle for articles to be kept cool. These two compartments are separated by means of a vertical partition, above which is a space, $a$, (when the cover is shut,) to allow the cold air to pass from the ice-box into the compartment D.

The walls surrounding the compartment D C are constructed as follows: The outer wall, $d$, is of wood, the inner wall or tank, $e$, is of metal, and the intermediate wall, $f$, is of glass. Between the glass and the inner and outer walls are air-spaces $g$ $g$. The glass plates $f$ are held in position by means of disks or strips $h$, of cork or other elastic non-absorbent material which is sufficiently yielding to prevent the glass plates from being broken by shocks or concussions.

The lid or cover of the chest is composed of three walls, the intermediate one being of glass, and with one air-space.

E designates an ice-support having a perforated bottom, $k$, short legs $l$, and longer legs $m$. The glass plate M, which is secured to the perforated bottom of the ice-support, affords a non-corrodible and non-absorbent surface to hold the ice, when arranged as shown in the figure. This stool or support is reversible, so that a greater or less quantity of ice may be kept dry and a greater or less quantity of water be kept cool.

It will be seen from the above description that I substitute plates of glass and air-spaces between the walls of the ice-chest for such substances as are usually employed, which are absorbents. I thus obtain absolute cleanliness and avoid all danger of taint and infection, and adapt the chest to be used in the sick-room at the bedside of the patient. Glass and confined air are the best non-conductors of heat, and they are entirely non-absorbents. Hence their adoption in the construction of the chest.

By reversing the stool E—that is, by mounting it on its longest legs—the space for ice will be contracted. It will then form a most convenient receptacle for cracked ice to be kept dry. Larger pieces of ice may be put beneath it, and ice-water may be freely drawn from the cock.

I claim as my invention—

1. The combination of the intermediate glass wall, the elastic supports therefor, the air-spaces, and the external and internal walls of a refrigerating-chest, substantially as described.

2. The reversible ice stool or support with a glass plate affixed to its perforated bottom, substantially as described.

In testimony that I claim the foregoing as my own I affix my signature in presence of two witnesses.

SAMUEL FRANKLIN COUES.

Witnesses:
    J. EDGAR CORLIES,
    RICHARD T. SMITH.